United States Patent [19]

Matsuo

[11] Patent Number: 4,716,457
[45] Date of Patent: Dec. 29, 1987

[54] ELECTRONIC ENDOSCOPIC SYSTEM

[75] Inventor: Satoshi Matsuo, Tochigi, Japan

[73] Assignee: Kabushiki Kaisha Toshiba, Kawasaki, Japan

[21] Appl. No.: 17,602

[22] Filed: Feb. 24, 1987

[30] Foreign Application Priority Data

Feb. 27, 1986 [JP] Japan .................................. 61-42290

[51] Int. Cl.$^4$ ........................ H04N 7/18; H04N 9/73; A61B 1/04; A61B 1/06
[52] U.S. Cl. ........................................ 358/98; 128/6; 358/1; 358/80
[58] Field of Search ................... 358/98, 1, 27, 28, 29, 358/80; 128/4–11

[56] References Cited

U.S. PATENT DOCUMENTS

| | | | |
|---|---|---|---|
| 4,525,736 | 6/1985 | Korman | 358/28 |
| 4,633,303 | 12/1986 | Nagasaki | 358/98 |
| 4,663,657 | 5/1976 | Nagasaki | 358/98 |
| 4,667,229 | 5/1987 | Cooper | 358/98 |

Primary Examiner—Howard E. Britton
Attorney, Agent, or Firm—Schwartz, Jeffery, Schwaab, Mack, Blumenthal & Evans

[57] ABSTRACT

An electronic endoscopic system comprises an endoscope having a solid-state element assembled to an end thereof, a memory for storing color correction data with respect to a reference color of sections to be obtained by dividing a chromaticity diagram plotted according to the color reproductivity of the solid-state imaging element, and a device for selectively addressing the color correction data stored in the memory.

5 Claims, 7 Drawing Figures

# ELECTRONIC ENDOSCOPIC SYSTEM

BACKGROUND OF THE INVENTION

1. Field of the Invention

The present invention relates to an electronic endoscopic system having an endoscope provided with a solid-state imaging element, and particularly to a device for correcting variations in the color reproductivity of the solid-state imaging element.

2. Description of the Prior Art

Generally, in an endoscopic inspection, a plurality of endoscopes are connected to one endoscopic system. In a large hospital, however, a plurality of the endoscopes are used in combination with a plurality of endoscopic systems in accordance with inspected portions etc. The combination between the endoscopes and the endoscopic systems is not fixed but selected arbitrarily depending on situations. Therefore, if no color correction is carried out on the endoscopic systems, the color reproductivity of the systems may differ from one another depending on the combination. The color reproductivity and its recording are very important subjects in clinical sites. Due to this, there have been proposed various devices such as a device which allows a user to change the amplitudes of red and blue color signals, and a device which has an internal memory for allowing a user to store therein correction values to be obtained after the user executes a color correction operation for all the combinations between endoscopes and endoscopic systems.

According to the device which allows a user to change only the amplitudes of red and blue color signals to correct color, data to be obtained may be affected by the subjectivity of the user (the operator). Therefore, an objective result is hardly obtained when the data are compared with each other according to the elapse of time by the same operator, or when the data are compared with data obtained by another operator.

On the other hand, according to the device which has an internal memory for allowing the user to store therein correction values to be obtained after the user executes a color correction operation for all the combinations between endoscopes and endoscopic systems, there may be no problem in connection with the objectivity in the color reproductivity, but it requires the user for bothersome work that the user shall obtain correction values for all the possible combinations between the endoscopes and the endoscopic systems and write the obtained correction values into the memory. If new endoscopes are purchased additionally, the above-mentioned work shall be reiterated for all the possible combinations between the newly purchased endoscopes and the endoscopic systems. Further, there is a drawback that even an endoscope of the same kind but brought from another place shall be subjected to the color correction before use because a color correction value for the brought endoscope is not stored in the memory of the endoscopic system.

SUMMARY OF THE INVENTION

An object of the present invention is to provide an electronic endoscopic system which can remove the problems of the above-mentioned prior art systems, automatically perform the color correction for all the combinations between endoscopic systems and endoscopes without bothering a user, and maintain the compatibility of all the endoscopes.

In order to accomplish the object mentioned in the above, an electronic endoscopic system according to the present invention stores in a memory the color correction data with respect to reference colors, of sections to be obtained by dividing a chromaticity diagram plotting the color reproductivity of a solid-state imaging element of an endoscope. According to this arrangement, since the color correction data are stored in the memory, a color correcting operation can automatically be carried out based on the color correction data when the endoscope is connected to the endoscopic system. Further, since the color reproductivity of the endoscope is obtained from the chromaticity diagram through calculation or as experimental values, the color correction data ensure the objective and compatible color adjustment for all endoscopes.

BRIEF DESCRIPTION OF THE DRAWINGS

The other objects, features and advantages of the present invention will become apparent from the following descriptions of the preferred embodiments taken in conjunction with the accompanying drawings in which.

DETAILED DESCRIPTION OF THE PREFERRED EMBODIMENTS

An electronic endoscopic system according to the present invention will now be described with reference to the accompanying drawings.

Figure 1:
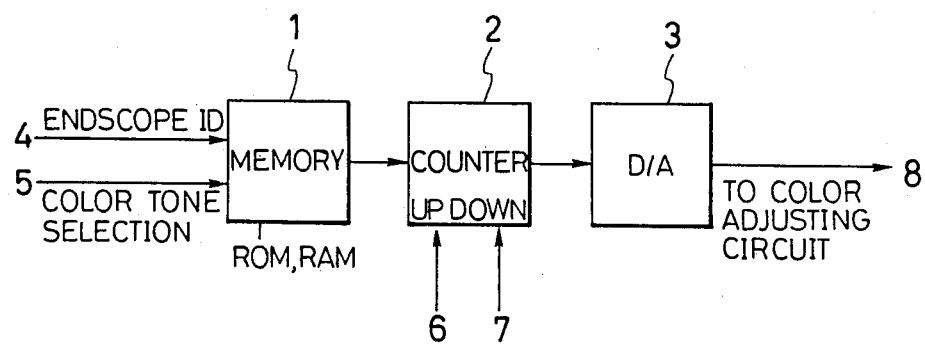
FIG. 1 is a block diagram showing the essential part of an electronic endoscopic system according to an embodiment of the present invention.

FIG. 1 is a block diagram showing a color correction circuit provided for an electronic endoscopic system according to an embodiment of the present invention. In the figure, a numeral 1 represents a memory formed by a ROM or a RAM, the details of which will be described later, provided for the system. The memory 1 is addressed by an endoscope identification (ID) 4 and a color tone selection signal 5, and outputs memory contents corresponding to the addressing input. A numeral 2 represents a counter to which an output from the memory 1 is supplied. The output of the memory 1 supplied to the counter 2 is input as it is into a digital-to-analog converter (hereinafter referred to as the "D/A") circuit 3, converted into an analog signal 8, and input into a known color adjusting circuit (not shown) provided for the endoscopic system.

An operator observes a television monitor (not shown) provided for the endoscopic system, and, if he is not satisfied with a color tone displayed on the television monitor, he may input a signal into a terminal 6 or 7 by operating a switch (not shown) to change the contents of the counter 2. Then, the output of the D/A converter circuit 3 is changed to change the color tone displayed on the television monitor.

To adjust the color tone, three colors of red, blue, and green shall be changed. However, generally, the green is fixed while the red and blue are changed in adjusting the color tone. Since a circuit configuration for changing the red is the same as that for changing the blue, only one circuit configuration for correcting the color is shown in the figure and described.

A feature of the present invention is the memory circuit 1 in the above-mentioned circuit configuration. The details of the memory 1 will be described.

Figure 2:
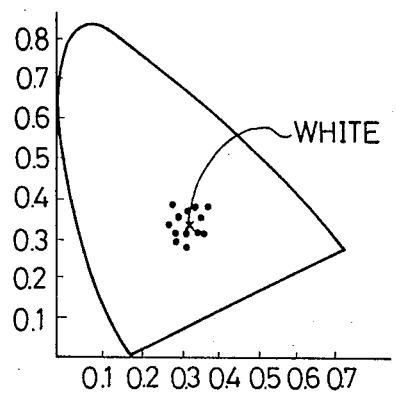
FIGS. 2 and 3 are views for explaining the contents of a memory of the electronic endoscopic system according to the present invention.

As described in the preamble, there are variations in the color reproductivity of a solid-state imaging element so that the color reproductivity of respective endoscopes is plotted on a chromaticity diagram at first. For this purpose, a testing white board is irradiated by a predetermined light source, and an image of the white board is picked up by the respective endoscopes. Signals thus obtained are input into a testing system to display the image of the white board on the television monitor, and then, the image is measured by a chromaticity meter to prepare the chromaticity diagram in which the signals are plotted around a point representing white, as shown in FIG. 2.

Figure 3:
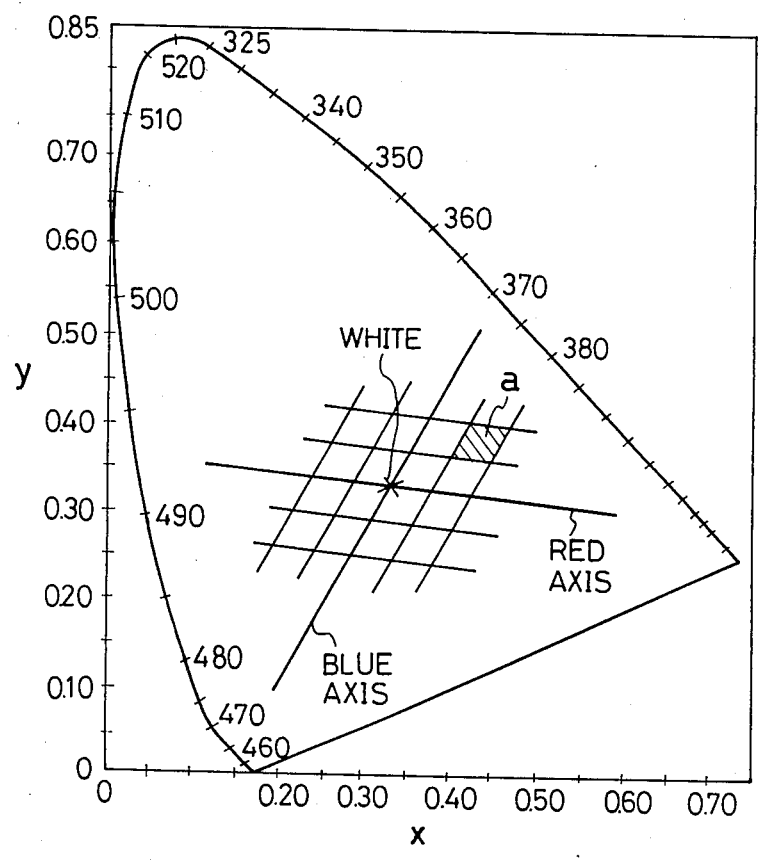

On the other hand, a red input of the color adjusting circuit is changed to plot the changes in the color on the chromaticity diagram. The same process is carried out for a blue input. As a result, two axes are drawn on the chromaticity diagram as shown in FIG. 3. The two axes will temporarily be referred to as a "red axis" and a "blue axis". After that, signals are input into the red input of the color adjusting circuit and into the blue input of the color adjusting circuit with properly selected steps to plot changes in color on the chromaticity diagram. Lines which pass through the points thus plotted and are parallel with the red axis and the blue axis are drawn on the chromaticity diagram. The chromaticity diagram is then divided into many sections "a" by the parallel lines with the point of white being an origin. The area of each section is selected such that a difference in color is not visually distinguished in the same one section (however, in FIG. 3, each section is shown with enlarged scale for easy understanding). Each section is given with an address. Thus, color correction signal levels (color correction data) for red and blue for bringing a color which belongs to a certain address to white is determined uniquely.

The color correction data corresponding to respective addresses are stored in the memory 1, while each endoscope is given with an ID which is an address corresponding to the color reproductivity of the endoscope. When an endoscope is connected to the endoscopic system, correction data corresponding to the address of the ID of the connected endoscope are automatically read out of the memory 1, converted by the D/A converter circuit, and input into the color adjusting circuit. As a result, variations in the color reproductivity of the endoscope can be removed.

In this way, according to the present embodiment, variations in the color reproductivity of an endoscope have been suppressed to an extent that cannot be distinguished visually.

Since the color of internal organs of an organism is reddish, a white matter in the internal organs may be viewed reddish due to light reflected by the wall of the internal organs. In addition, the effect of the color of internal organs differs depending on organs or individuals to be observed. Therefore, the color correction is carried out not only for white but also for color slightly biased to blue-green which is the complementary color of red, or there may be a user who performs the color correction with respect to yellow due to his experience in an endoscopic field. Accordingly, in the first embodiment shown in FIG. 1, correction data for a plurality of colors are stored in the memory 1 so that a color tone to be displayed may be selected among them. To realize such a selection, the color tone selection signal 5 is added as a part of the memory address.

Figure 4:
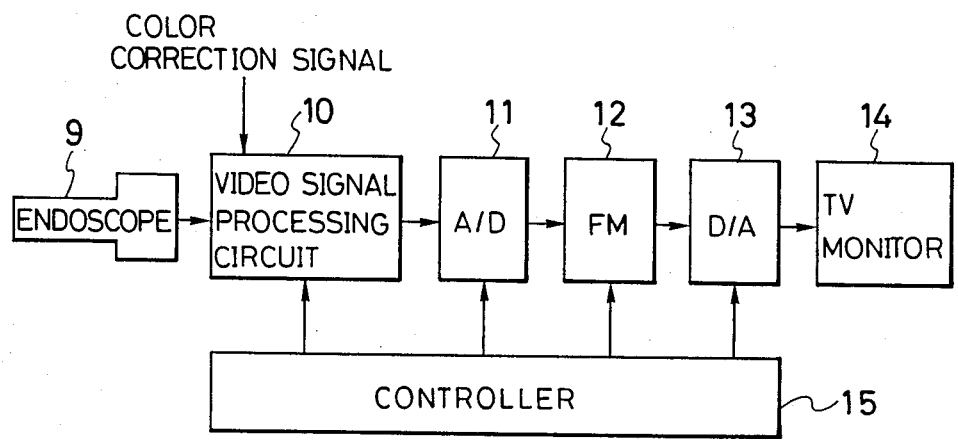
FIGS. 4, 5A, 5B, and 5C are views for explaining electronic endoscopic systems according to another embodiments of the present invention.

FIGS. 4, 5A, 5B, and 5C are views showing another embodiments of the color correction circuit, in addition to the first embodiment shown in FIG. 1. FIG. 4 is a view showing an example of an endoscopic system having a digital scan converter in which a video signal is converted into a digital signal, stored once in a memory, and converted into an analog signal again to display an image on a television monitor.

In the figure, a numeral 9 represents an endoscope having a solid-state imaging element assembled to an end thereof, 10 a video signal processing circuit for receiving and processing a signal from the endoscope 9 to output a desired video signal such as a composite signal or an RGB signal, and 11 an A/D converter for converting the output signal of the video signal processing circuit 10 into a digital signal to be stored in a frame memory 12. The frame memory 12 comprises a memory circuit which can store signals for one picture plane or more and is referred to as the "FM". A numeral 13 represents a D/A converter for converting an output signal of the FM 12 into an analog video signal again, 14 a television monitor for displaying an image on a CRT according to a composite video input or an RGB input in the same manner as that of a standard television, and 15 a controller for controlling the timing and mode setting of the above-mentioned blocks 10 to 13.

Figure 5A:
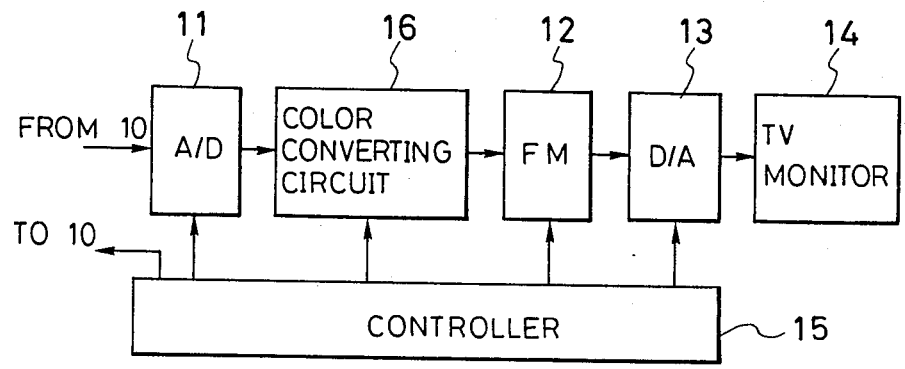
Figure 5B:
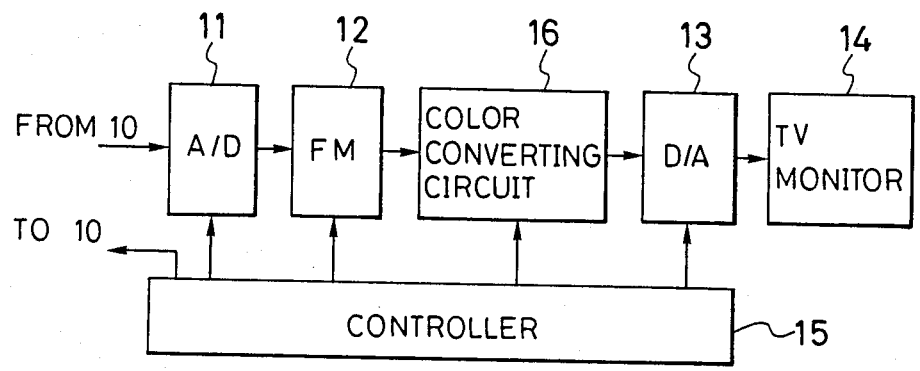
Figure 5C:
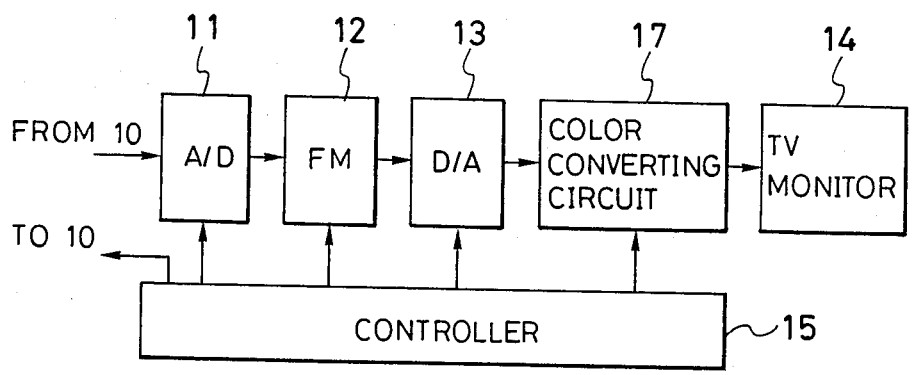

Supposing RGB signals are processed in the above-mentioned circuit, the same effect as that of the previously described correction circuit can be realized if the color correction is performed in any one of the blocks from the A/D converter 11 to the television monitor 14. FIGS. 5A, 5B, and 5C show respective such cases. Since digital signals are processed in these cases, a color converting circuit 16 can easily be realized by a memory such as a ROM or a RAM. For instance, the color converting circuit 16 can be made of the RAM, and data may be transferred from the memory 1 or the counter 2 shown in FIG. 1 to the color converting circuit 16 to realize the color correction. Naturally, the color converting circuit 16 may be made by the ROM to realize the same effect.

In FIG. 5B, the color converting circuit 16 is disposed between the frame memory FM and the D/A converter 13 to provide the same effect.

In an embodiment shown in FIG. 5C, the color conversion is carried out after a signal is converted into an analog signal so that a programmable gain control circuit may be used to control the gain of a color converting circuit 17 according to an output from the memory 1 or the counter 2, to realize the same effect as that achieved by the color converting circuit 16 shown in FIG. 5A. As a result, the color can be corrected.

As described in the above, the embodiments of the present invention can provide the following effects:

(I) Since the color reproductivity of endoscopes only is tested to determine the IDs of the endoscopes, the constant color reproductivity can automatically be provided always for all the combinations between the endoscopes and any of endoscopic systems. Namely, since color correction data are obtained from experimental values or calculated, according to the results of the test of variations in the color reproductivity of the endoscopes, the objectivity can be maintained in correcting the color.

(II) Due to the above, even if new endoscopes are purchased additionally, the same color reproductivity as that of the existing endoscopes will be obtained without newly performing the color adjustment. Namely, the compatibility in the endoscopes can be maintained.

(III) Therefore, changes in the color of the affected part of an organ with the elapse of time can be traced quantitatively to compare and study the changes.

(IV) A correction reference color can be selected among a plurality of correction reference colors depending on an internal organ to be inspected.

As described in the above, according to the present invention, for all the combinations between endoscopes and endoscopic systems, the color correction can automatically be made, and the objectivity and compatibility maintained.

It should be understood that the foregoing description relates only to the preferred embodiments of the present invention and that numerous modifications and alterations may be made therein without departing from the spirit and scope of the invention.

What is claimed is:

1. An electronic endoscopic system comprising:
   an endoscope means having an imaging element assembled to an end thereof;
   a memory means for storing color correction data with respect to a reference color, of respective sections obtained by dividing a chromaticity diagram plotted based on the imaging element; and
   means for selectively addressing the color correction data stored in said memory means.

2. An electronic endoscopic system as claimed in claim 1, wherein said reference color is provided in a plural number.

3. An electronic endoscopic system as claimed in claim 1, wherein said endoscope means is used as an address for reading out the color correction data stored in said memory means.

4. An electronic endoscopic system as claimed in claim 1, wherein said memory means is provided with a memory circuit for storing at least one of said sections.

5. An electronic endoscopic system as claimed in claim 1, wherein a color correction operation is carried out according to said color correction data, between an A/D converter for converting a signal from said endoscope means into a digital signal and a television monitor for displaying an image.

* * * * *